United States Patent
Maladen et al.

(10) Patent No.: US 11,983,549 B2
(45) Date of Patent: May 14, 2024

(54) MULTI-TIERED GRAPHICAL USER INTERFACE (GUI) SYSTEMS AND METHODS FOR INTEROPERATING BETWEEN MULTIPLE MOBILE APPLICATION MODES DURING A REAL-TIME CAREGIVING EVENT

(71) Applicant: The Procter & Gamble Company, Cincinnati, OH (US)

(72) Inventors: Ryan Dominic Maladen, Anderson Township, OH (US); Galen E. Graham, Cincinnati, OH (US); John Gregory Warzala, Cincinnati, OH (US); Guillermo Matias Vidal, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 99 days.

(21) Appl. No.: 17/715,074

(22) Filed: Apr. 7, 2022

(65) Prior Publication Data

US 2022/0326969 A1   Oct. 13, 2022

Related U.S. Application Data

(60) Provisional application No. 63/172,772, filed on Apr. 9, 2021.

(51) Int. Cl.
*G06F 9/451* (2018.01)
*G06F 3/0484* (2022.01)
*G09B 19/00* (2006.01)

(52) U.S. Cl.
CPC ............ *G06F 9/451* (2018.02); *G06F 3/0484* (2013.01); *G09B 19/0076* (2013.01)

(58) Field of Classification Search
CPC ...... G06F 3/0484; G06F 3/0483; G06F 9/451; G06F 16/74; G06F 16/7867; G11B 27/02; G09B 19/0076
See application file for complete search history.

(56) References Cited

U.S. PATENT DOCUMENTS 10,490,307 B1 * 11/2019 Stamboni ............... G06N 20/00
11,062,583 B1 *  7/2021 Sathaye ............. G08B 21/0233
(Continued)

FOREIGN PATENT DOCUMENTS

WO   WO-2019082487 A1 *  5/2019 ........... A61F 13/505

*Primary Examiner* — Daniel Samwel
(74) *Attorney, Agent, or Firm* — Richard L. Alexander

(57) ABSTRACT

Multi-tiered graphical user interface (GUI) systems and methods are described for interoperating between multiple mobile application modes during a real-time caregiving event. An expert GUI and a novice GUI are rendered having a an expert mode and an novice mode, respectively, that share a control state for passing operation between the expert mode and the novice mode. A triggering of a caregiving event is detected that causes the passing of the control state from the expert mode to the novice mode, and the rendering of a novice GUI in an interoperated sequence following rendering of the expert GUI. Caregiving data of a novice user is generated during the novice mode, wherein the novice GUI, as rendered during the novice mode, comprises a different interface compared with the expert GUI, and the novice GUI configured for manipulation by the novice user.

31 Claims, 4 Drawing Sheets

(56) References Cited

U.S. PATENT DOCUMENTS

| | | | | |
|---|---|---|---|---|
| 2007/0222618 A1* | 9/2007 | Randall | ............. | G09B 19/0076 340/573.1 |
| 2009/0326491 A1* | 12/2009 | Long | ................ | A61F 13/42 604/385.01 |
| 2012/0094262 A1* | 4/2012 | Brodle | ................ | G09B 5/06 434/304 |
| 2014/0004490 A1* | 1/2014 | Welling | ................ | G09B 19/00 434/236 |
| 2014/0154654 A1* | 6/2014 | Jackson | ............ | G09B 19/0076 434/247 |
| 2014/0273717 A1* | 9/2014 | Judkins | ................ | A63H 3/28 446/175 |
| 2014/0329212 A1* | 11/2014 | Ruman | ................ | G09B 5/06 434/236 |
| 2016/0125759 A1* | 5/2016 | Dougherty | ......... | G09B 19/0076 434/236 |
| 2017/0293846 A1* | 10/2017 | Zyglowicz | ............. | G16H 10/65 |
| 2019/0117468 A1* | 4/2019 | Toong | ................ | A61F 13/84 |
| 2019/0254582 A1* | 8/2019 | Wei | ................ | G16H 40/67 |
| 2019/0328303 A1* | 10/2019 | Nelson | ................ | A61N 1/36132 |
| 2020/0284416 A1* | 9/2020 | Greiner | ............... | F21V 23/0478 |
| 2021/0243575 A1* | 8/2021 | Leth | ................ | G06Q 10/02 |

* cited by examiner

US 11,983,549 B2

MULTI-TIERED GRAPHICAL USER INTERFACE (GUI) SYSTEMS AND METHODS FOR INTEROPERATING BETWEEN MULTIPLE MOBILE APPLICATION MODES DURING A REAL-TIME CAREGIVING EVENT

CROSS REFERENCE TO RELATED APPLICATION

This application claims the benefit of U.S. Provisional Application No. 63/172,772, filed Apr. 9, 2021, the substance of which is incorporated herein by reference.

FIELD

The present disclosure generally relates to multi-tiered graphical user interface (GUI) systems and methods, and more particularly to, multi-tiered GUI systems and methods for interoperating between multiple mobile application modes during a real-time caregiving event.

BACKGROUND

Hygiene and personal disease safety is becoming increasingly important, especially in the midst of a global pandemic (e.g., regarding Corona Virus Disease 2019 (COVID-19). Unfortunately, as care and training for specific hygiene and personal disease safety and sanitation become increasingly important, there are fewer resources and/or personnel for the adequate provision of quality training or instruction regarding how to implement safety procedures, hygiene, and/or personal disease safety. Such problems are exacerbated when considering social isolation imposed by government lockdowns and/or social distancing requirements or recommendations.

In addition, these hygiene and personal disease safety problems can exist at all age groups and experience levels. For example, parents (especially new ones) struggle with knowing how and when to provide caregiving (e.g., toilet training or "potty" training) to their children, and clarity on how to approach such issue remains ambiguous. For example, for toilet training, parents face a reality of different stages, across a 4-5 year cycle, that involve diapers, toilet usage, waste disposal, hand sanitation, etc. which may all occur at different times and locations, including for example, day training, night training, urinating standing up, going to the restroom in public and/or at school, wiping, etc. Thus vast differences may exist in each stage of toilet training, where different responsibilities may come with each stage. Each stage presents unique challenges that require different tools and strategies to solve and provide for adequate hygiene related solutions. These hygiene problems can of course exist at any age considering the unique needs and debilitations.

Other hygiene and personal disease safety processes face similar challenges, and with lack of hygiene and personal disease safety, an automated or computer guided solution is needed to provide and/or facilitate hygiene and personal disease safety, especially during disease, epidemic, and/or pandemic states.

For the foregoing reasons, there is a need for multi-tiered graphical user interface (GUI) systems and methods for interoperation between multiple mobile application modes during a real-time caregiving event.

SUMMARY

Generally, as described herein, multi-tiered GUI systems and methods are provided for interoperation between multiple mobile application modes during a real-time caregiving event, such as a caregiving event. Such GUI systems and methods provide robust hygiene and/or personal disease training, tracking, education, and/or usage, and education of hygiene and/or safety, including through artificial intelligence (AI) solutions and/or distributed system architecture.

In various aspects, the multi-tiered GUI systems and methods are implemented as mobile applications (apps) on one or more mobile devices. For example, an expert user (e.g., parent) can manipulate an expert GUI to interact with a novice user (e.g., a child) who, in turn, manipulates a novice GUI. The expert GUI and the novice GUI are interoperated or otherwise sequenced or communicatively coupled (e.g., via cellular networks, BLUETOOTH and/or WIFI) to provide hygiene related training, instruction, resources, tracking, social distancing, and/or to otherwise facilitate electronic hygiene and personal disease safety in a variety of fields and/or activities, e.g., toilet training, hand washing, etc.

In some aspects, a mobile app may be comprised of one or more sets of mobile app instructions that may be programmed or coded together in a single mobile app as implemented on a single mobile device. In other aspects, the mobile app may be comprised of multiple sets of mobile app instructions that may be programmed or coded as separate mobile apps as implemented on a multiple mobile devices and designed to communicate with each other across a computing network. In either of these aspects, the mobile app and/or its computing instructions may be configured as a native application implemented or execution of a mobile device (e.g., APPLE iOS based mobile device and/or GOOGLE ANDROID based mobile device) of a user.

In various aspects, the mobile app and/or its computing instructions may communicate with a server or platform (e.g., cloud platform), for example, to record or receive data regarding hygiene tracking, recording, safety, milestones, and/or recommend or related products for improved safety or hygiene, etc. Such data may be used to train an AI model, such as an adaptive learning model as described herein.

In addition, in various aspects, the multi-tiered GUI systems and methods are implemented as mobile applications (apps) on one or more mobile devices to provide additional and/or interoperated GUI features or tools to provide improved safety or hygiene, or interaction, etc. For example, such features include, e.g., scanning of physical products (e.g., having QR code or being embossed) to identify products that solve specific hygiene needs; sensor based tracking (e.g., track day-time incidents such as for external sensor for diaper habits or tracking); timing of hygiene incidents (e.g., toilet training incidents); smart learning, using an AI model, of novice user's caregiving events (e.g., child's toilet training events) in order to learn the novice's ideal duration between caregiving events; sending reminders to expert users regarding caregiving events (e.g., notification regarding toilet training events); providing, securely, caregiving app/data with a third party (e.g., care taker) on a third mobile device; and/or providing images or text to social media networks to provide milestones of caregiving, such as hygiene training.

In still further aspects a the mobile applications (apps), and the related sets of app computing instructions, provide different modes/screens, i.e., a parent screen and a child screen or GUI for sharing/switching the mobile device(s) between two users.

More specifically, as described herein, a multi-tiered graphical user interface (GUI) system is disclosed. The multi-tiered GUI system is configured to interoperate between multiple mobile application modes during a real-time toilet training event. The multi-tiered GUI system comprises: a first set of mobile application (app) instructions configured to render a parental GUI operating in a parental mode, the first set of mobile app instructions configured for execution by one or more processors of one or more mobile devices; a second set of mobile app instructions configured to render a child GUI operating in a child mode, the second set of mobile app instructions configured for execution by the one or more processors of the one or more mobile devices; and a server comprising one or more processors and one or more memories, wherein each of the one or more mobile devices are communicatively coupled to the server. The parental mode and the child mode share a control state for passing operation between the parental mode and the child mode. The first set of mobile app instructions is configured to indicate a triggering of a toilet training event, the triggering of the toilet training event causing each of: (a) the control state to be passed from the parental mode to the child mode, and (b) the child GUI to be rendered in an interoperated sequence following the parental GUI. Toilet training data of a juvenile user is generated during the child mode. The training data may be recorded on the one or more memories of the server. The child GUI, as rendered during the child mode, comprises a different interface compared with the parental GUI, the child GUI configured for manipulation by the juvenile user.

In additional aspects, as described herein, a multi-tiered GUI system is disclosed that is configured to interoperate between multiple mobile application modes during a real-time caregiving event. The multi-tiered GUI system comprises a first set of mobile application (app) instructions configured to render an expert GUI operating in an expert mode, the first set of mobile app instructions configured for execution by one or more processors of one or more mobile devices; a second set of mobile app instructions configured to render a novice GUI operating in a novice mode, the second set of mobile app instructions configured for execution by the one or more processors of the one or more mobile devices; and a server comprising one or more processors and one or more memories, wherein each of the one or more mobile devices are communicatively coupled to the server. The expert mode and the novice mode share a control state for passing operation between the expert mode and the novice mode. The first set of mobile app instructions is configured to indicate a triggering of a caregiving event, the triggering of the caregiving event causing each of: (a) the control state to be passed from the expert mode to the novice mode, and (b) the novice GUI to be rendered in an interoperated sequence following the expert GUI, wherein caregiving data of a novice user is generated during the novice mode, wherein the caregiving data is recorded on the one or more memories of the server, and wherein the novice GUI, as rendered during the novice mode, comprises a different interface compared with the expert GUI, the novice GUI configured for manipulation by the novice user.

In still further aspects, as described herein, multi-tiered GUI method is disclosed for interoperation between multiple mobile application modes during a real-time caregiving event. The multi-tiered GUI method comprises: rendering an expert GUI operating in an expert mode; rendering a novice GUI operating in a novice mode, wherein the expert mode and the novice mode share a control state for passing operation between the expert mode and the novice mode; detecting, with a first set of mobile app instructions, a triggering of a caregiving event; passing, based on a triggering of the caregiving event, the control state from the expert mode to the novice mode; rendering, based on the triggering of the caregiving event, the novice GUI in an interoperated sequence following rendering of the expert GUI; and generating caregiving data of a novice user during the novice mode. The novice GUI, as rendered during the novice mode, comprises a different interface compared with the expert GUI, the novice GUI configured for manipulation by the novice user.

In accordance with the above, and with the disclosure herein, the present disclosure describes improvements in computer functionality or in improvements to other technologies or technical fields at least because the disclosure describes, e.g., a distributed system across various devices, including mobile devices(s) and a server, where each are involved in generating, tracking, and using caregiving data and/or related caregiving event related data in the distributed system for purposes of caregiving. The use of the distrusted system (as opposed to a single system) reduces the processing and memory requirements or load on each of the various computing device in the distributed system. That is, each of these devices, are configured to operate in a distributed, multi-tiered GUI system that improves the operation, storage, and processing of the devices as a whole, where each device is leveraged for compute specific tasks. For example, one tier of the multi-tiered GUI system may comprise an expert GUI designed to track and monitor caregiving data as differently generated by a second tier of the multi-tiered GUI system, e.g., a novice GUI. In addition, a server may comprise an addition portion of the multi-tiered GUI system, where the data generated and tracked by the expert GUI and novice GUI may be transmitted to and used by the server to perform compute intense activities, such as train an adaptive learning model as described herein. Separating the processing and memory requirements of the individual devices provides a distributed system that improves the performance of the multi-tiered GUI system as a whole. By contrast, previous hygiene tracking systems, that operated on a single device (e.g., a single mobile device), were devoid of such performance improvements.

In addition, the present disclosure relates to improvement to other technologies or technical fields at least because the present disclosure describes or introduces improvements to underlying computing devices, e.g., the server(s) and or mobile device(s), where the server(s) and/or mobile device(s) are improved with an adaptive learning model trained with caregiving data of other users and are adapted to provide or output AI based predictions for hygiene related training events as described herein. The adaptive learning model improves over previous caregiving event training applications or devices at least because a computing device, e.g., server(s) and/or mobile device(s), implementing or executing the adaptive learning model is able to more accurately predict and provide future-looking events, as displayed on via the GUIs of the multi-tiered GUI system, that may be used in the field of hygiene tracking and training that was heretofore unavailable with previous devices or technologies in the field. In addition, the adaptive learning model is further configured to be updated and evolve as it learns its user-specific hygiene related events and otherwise behavior(s), thereby further improving the underlying multi-tiered GUI system.

In addition, the present disclosure includes specific features other than what is well-understood, routine, or conventional activity in the field, by adding unconventional steps that confine the claim to a particular useful application, e.g., interoperating between multiple mobile application modes during a real-time caregiving event.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
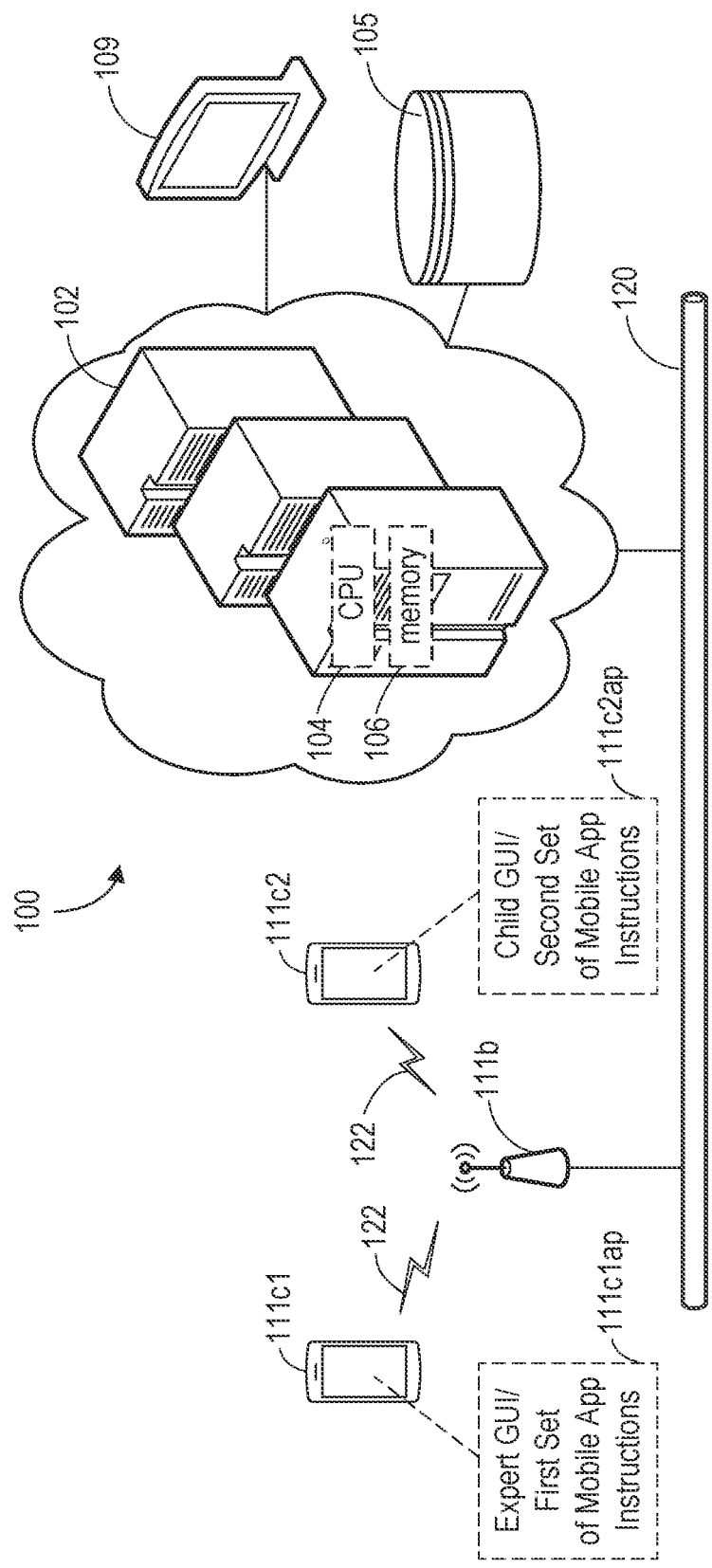
FIG. 1 illustrates an example multi-tiered GUI system configured to interoperate between multiple mobile application modes during a real-time caregiving event, in accordance with various aspects disclosed herein.

FIG. 1 illustrates a multi-tiered GUI system 100 configured to interoperate between multiple mobile application (app) modes during a real-time caregiving event, in accordance with various aspects disclosed herein. Generally, as described herein, hygiene, or a hygiene related event, refers to disease control, sanitation, and/or training regarding disease control and/or sanitation, or otherwise hygiene, sanitation, safety and/or learning regarding safety or hygiene practices. By way of non-limiting example only, such hygiene, or a hygiene related events, may refer to hand sanitation, toilet training, medical equipment or device training or use, or the like. It should be understood, however, that additional and/or different hygiene, or a hygiene related events, may be used and/or tracked with the multi-tiered GUI systems and methods described herein.

Figure 3A:
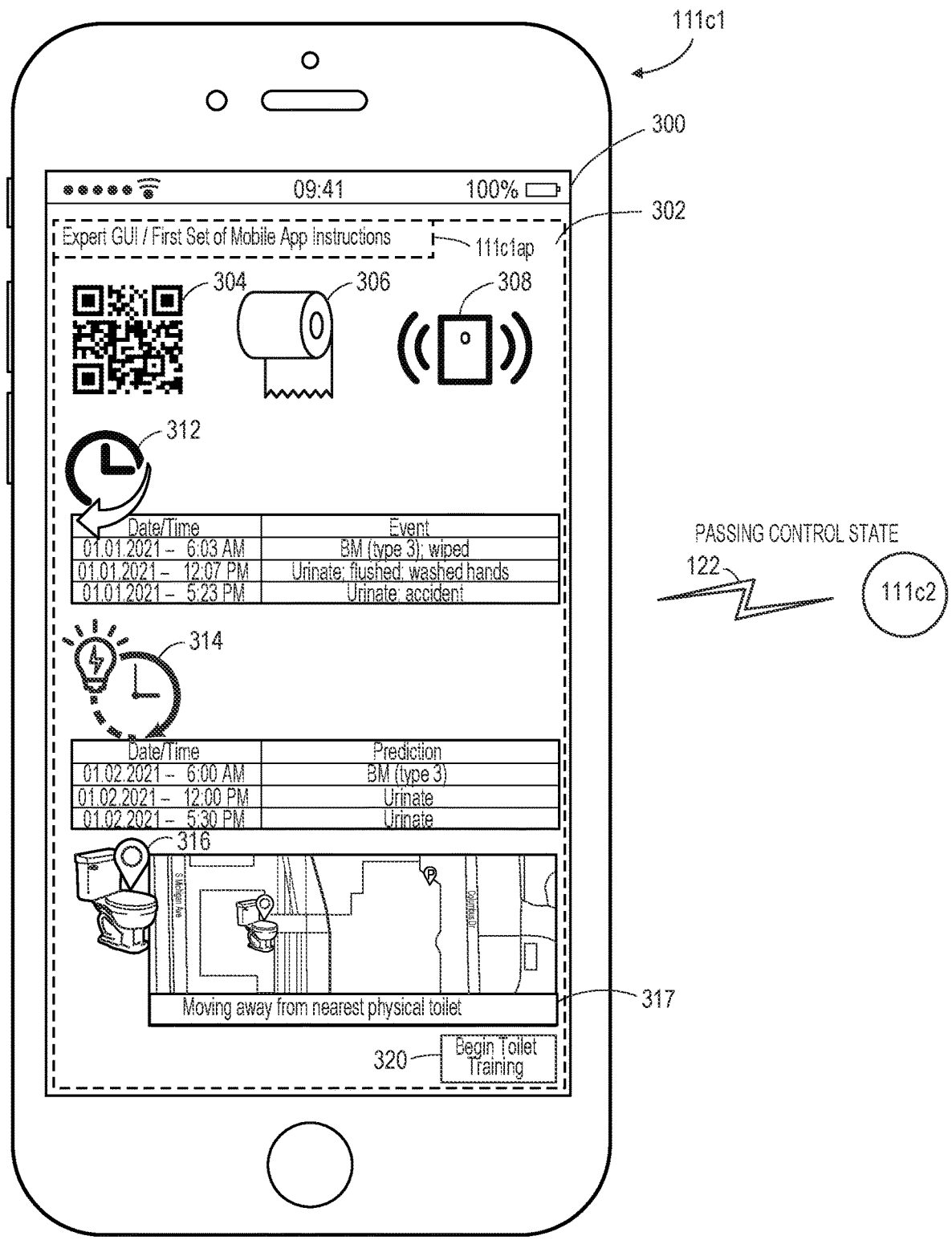
FIG. 3A illustrates an example expert GUI as rendered or displayed on a screen of a first mobile device by first set of mobile application (app) instructions and configured for sharing a control state for passing operation between an expert mode and a novice mode, in accordance with various aspects disclosed herein.
Figure 3B:
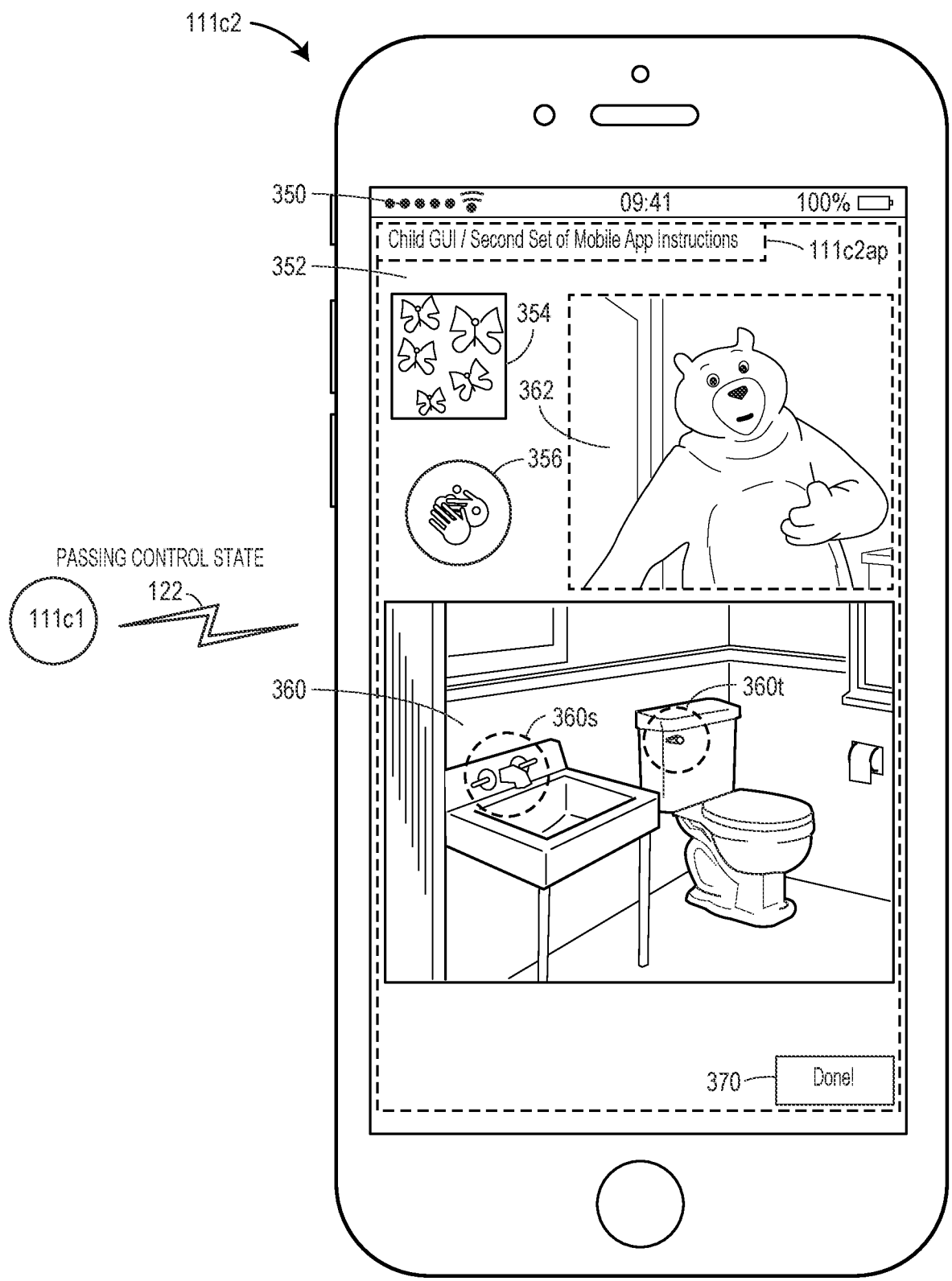
FIG. 3B illustrates an example novice GUI as rendered or displayed on a screen of a second mobile device by second set of mobile application (app) instructions and configured for sharing the control state for passing operation between the expert mode (as described for FIG. 3A) and the novice mode, in accordance with various aspects disclosed herein.

In the example of FIG. 1, the multi-tiered GUI system 100 comprises a first set of mobile application (app) instructions 111$c$ lap configured to render a parental GUI 302 operating in an expert mode (as illustrated by FIG. 3A herein). Multi-tiered GUI system 100 further comprises a second set of mobile app instructions 111 configured to render a novice GUI 352 operating in a novice mode (as illustrated by FIG. 3B herein).

Each of the first set of mobile app instructions and second set of mobile app are configured for execution by one or more processors of one or more mobile devices, for example, mobile device 111$c$1 and/or 111$c$2. Mobile devices 111$c$1 and 111$c$2 may comprise mobile devices and/or client devices, which may be commutatively coupled to server(s) 102. Such mobile devices may comprise one or more mobile processor(s) and/or a digital camera for capturing images and/or video. Each of the one or more user mobile devices 111$c$1 and 111$c$2 may include a display screen for displaying graphics, images, text, products, product information, maps, data, pixels, features, and/or other such visualizations or information as described herein. A mobile device may render an interface or a guided user interface (GUI) for displaying text and/or images on its display screen. Mobile devices 111$c$1 and 111$c$2 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

Each of first set of mobile app instructions 111$c$ lap and the second set of mobile app instructions 111$c$2$ap$ may comprise any one or more of one or more a mobile applications(s) and/or web browser application(s). First set of mobile app instructions 111$c$ lap and second set of mobile app instructions 111$c$2$ap$ may be coupled via computer network 120 to server (e.g. server(s) 102). First set of mobile app instructions 111$c$ lap and second set of mobile app instructions 111$c$2$ap$ may comprise a code for generation of graphic user interfaces (GUI) configured to display, on a screen of a mobile device (e.g., as illustrated for FIGS. 3A and 3B, herein).

Figure 2:
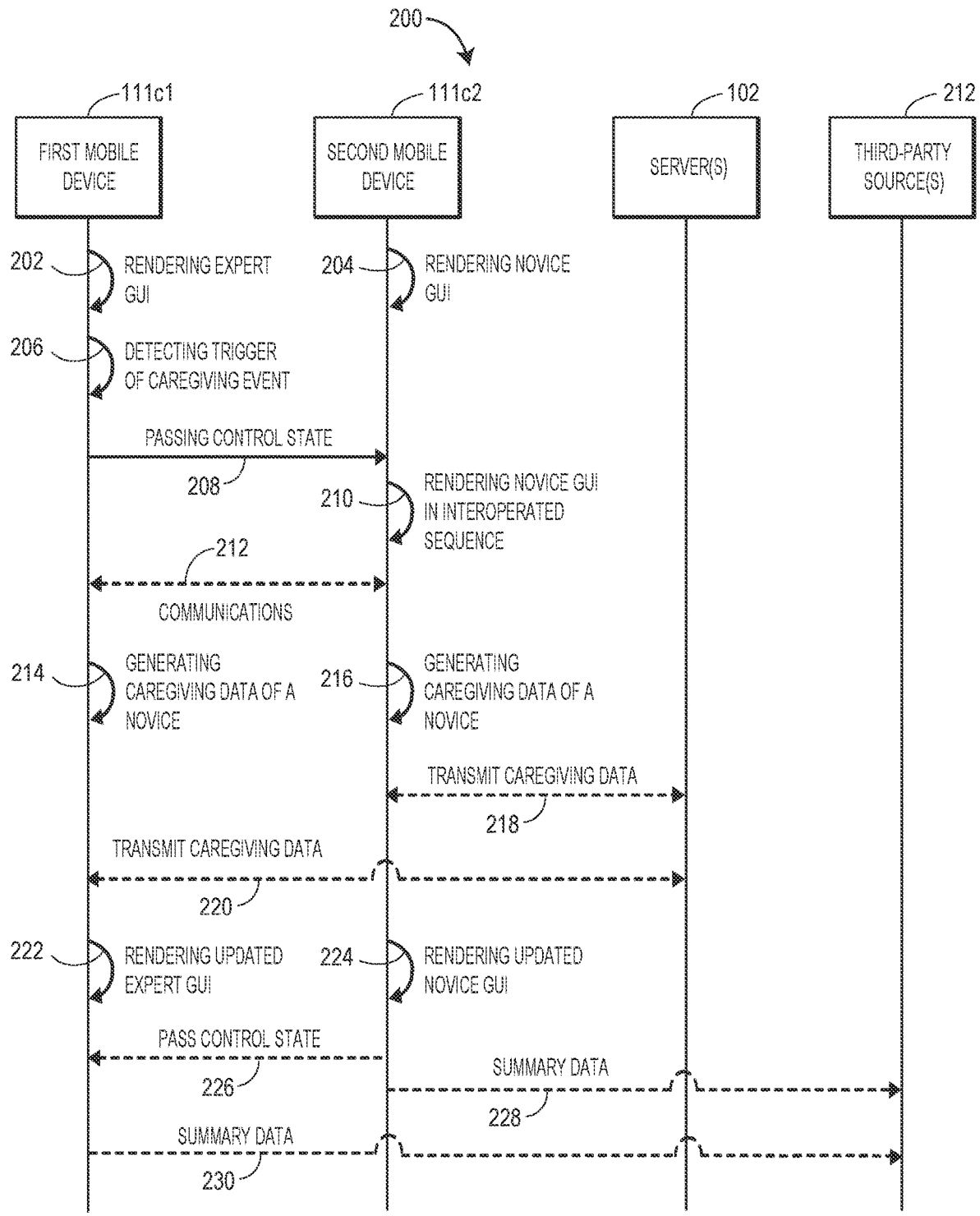
FIG. 2 illustrates an example multi-tiered GUI method for interoperation between multiple mobile application modes during a real-time caregiving event, in accordance with various aspects disclosed herein.

For example, in various aspects, the one or more user mobile devices 111$c$1 and 111$c$2 may implement or execute an operating system (OS) or mobile platform such as APPLE's iOS and/or GOOGLE's Android operation system. Any of the one or more user mobile devices 111$c$1 and 111$c$2 may comprise one or more processors and/or one or more memories for storing, implementing, or executing computing instructions (first or second instructions as describe herein), e.g., comprising one or more mobile apps. For example, as shown in FIG. 1, first set of mobile app instructions 111$c$ lap and second set of mobile app instructions 111$c$2$ap$ may be stored locally on a memory of a user mobile device (e.g., mobile device 111$c$1 and mobile device 111$c$2, respectively). In various aspects, first set of mobile app instructions 111$c$ lap and second set of mobile app instructions 111$c$2$ap$ comprise computing app code or apps configured for implementation on a mobile devices mobile devices 111$c$1 and 111$c$2 and are programmed in a programming language for the operating system (OS) of the underlying mobile device, which can include Objective-C and/or SWIFT for APPLE iOS based devices, Java for GOOGLE ANDROID devices, and the like. In additional embodiments, a mobile app, and its related set of mobile app instructions as described herein, may be implemented as a browser-based web application (app) implemented in Hyper Text Markup Language (HTML), JavaScript, and/or other such similar web-based technologies. The mobile app instructions may be implemented on a laptop computer or even a desktop computer or device. FIG. 2. herein provides an example method, illustrated as a flow diagram, illustrating an algorithm for implementing first set of mobile app instructions 111c lap and second set of mobile app instructions 111c2ap.

The first set of mobile app instructions 111c lap and second set of mobile app instructions 111c2ap operate together, but in their respective modes, expert mode and novice mode, and share a control state for passing operation between the expert mode and the novice mode. As configured, the first set of mobile app instructions 111c lap is programmed to indicate a triggering of a caregiving event. The triggering of the caregiving event causes each of: (a) the control state to be passed from the expert mode to the novice mode, and (b) the novice GUI (e.g., as illustrated by FIG. 3B) to be rendered in an interoperated sequence following the expert GUI (e.g., as illustrated herein by FIG. 3A). Caregiving data (e.g., hygiene data such as toilet training data) of a novice user (e.g., child) is generated during the novice mode. The novice GUI, as rendered during the novice mode, comprises a different interface compared with the expert GUI, the novice GUI configured for manipulation by the novice user. In some aspects, a different interface can comprise a simplified interface. For example, a simplified interface can include a GUI with larger buttons, color graphics, and/or annotations as designed for a novice or juvenile user. This is further described herein with respect to FIGS. 2, 3A, and 3B.

In some aspects, and as shown for FIG. 1, the first set of mobile app instructions 111c lap are part of a first mobile app configured for execution on one or more processors of a first mobile device (e.g., mobile device 111c1) and the second set of mobile app instructions 111c2ap are part of a second mobile app configured for execution on one or more processors of a second mobile device (e.g., mobile device 111c2). As illustrated for FIG. 1, the first mobile device (e.g., mobile device 111c1) is communicatively coupled (e.g., wirelessly via BLUETOOTH OR WIFI (802.11) or wired (USB)) to the second mobile device. In such aspects, each of the first set of mobile app instructions 111c lap as part of the first mobile app and the second set of mobile app instructions 111c2ap as part of a second mobile app may be downloaded from app stores (e.g., APPLE APP STORE and/or GOOGLE PLAY) and installed on mobile device 111c1 and 111c2, respectively. In such aspects, passing a control state from a parental mode to a child mode (e.g., from mobile device 111c1 to mobile device 111c2) causes a child GUI (e.g., as illustrated herein for FIG. 3B) to be rendered on a display screen of the second mobile device (e.g., mobile device 111c2), and/or vice-versa.

In additional, or alternative, aspects the first set of mobile app instructions 111c lap and the second set of mobile app instructions 111c2ap are part of a single mobile application (app). In such aspects, the single app is configured to display, switch, or transition GUIs (e.g., from the GUI of FIG. 3A to the GUI of FIG. 3B, and/or vice versa) based on the mode and/or control state as passed or implemented on one or more processors a single mobile device (e.g., as implemented on mobile device 111c1 to mobile device 111c2 alone).

Further, in additional aspects, a third set of mobile app instructions (not shown) may be configured to render a second expert or parental GUI operating in an expert or parental mode. The third set of mobile app instructions may be configured for execution by one or more processors of one or more mobile devices (e.g., a mobile device such as mobile device 111c1 to mobile device 111c2). In such aspects, triggering of a caregiving event (e.g., toilet training event) causes a novice or child GUI to be rendered in an interoperated sequence following the second expert or parental GUI. The second expert or parental GUI may the same or similar to that as shown for FIG. 3A herein, and may provide an additional GUI for a second expert (e.g., nurse or doctor) or parent (e.g., mother, data, etc.), or, more, generally for a second expert operator, in order to track, monitor, or otherwise interact with the multi-tiered GUI system 100 as described herein.

Mobile devices 111c1 and 111c2 may each comprise a wireless transceiver to receive and transmit wireless communications 122 to and from base station 111b. In various aspects, data and information, e.g., related to passing control state, caregiving data, and/or as otherwise data described herein may be transmitted between Mobile devices 111c1 and 111c2 via base station 111b. Additionally, or alternatively, mobile devices 111c1 and 111c2 may communicate directly without a base station, e.g., via BLUETOOTH or other wireless or wired (USB) standard.

In the example of FIG. 1, Mobile devices 111c1 and 111c2 are communicatively coupled via base station 111b and computer network 120 with server(s) 102. In some aspects, base station 111b may comprise a cellular base station, such as cell towers, communicating to the one or more user mobile devices 111c1 and 111c2 via wireless communications 122 based on any one or more of various mobile phone standards, including NMT, GSM, CDMA, UMMTS, LTE, 5G, or the like. Additionally or alternatively, base station 111b may comprise routers, wireless switches, or other such wireless connection points communicating to the one or more user mobile devices 111c1 and 111c2 via wireless communications 122 based on any one or more of various wireless standards, including by non-limiting example, IEEE 802.11a/b/c/g (WIFI), the BLUETOOTH standard, or the like.

Server(s) 102 may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memorie(s) 106.

Memorie(s) 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 106 may store an operating system (OS) (e.g., MICROSOFT WINDOWS, LINUX, UNIX, etc.) capable of facilitating the functionalities, apps, methods, or other software as discussed herein. Memories 106 may store machine readable instructions, including any of one or more application(s) (e.g., applications that communicate with the first and second sets of mobile app instructions or apps as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be configured to facilitate their various functionalities discussed herein. It should be appreciated that one or more other applications may be envisioned and that are executed by the processor(s) 104.

Processor(s) 104 may be connected to the memorie(s) 106 via a computer bus responsible for transmitting and/or receiving electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memorie(s) 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, caregiving data, training data, and/or as otherwise described herein.

Server(s) 102 may further include a communication component configured to communicate (e.g., send and receive) data or information (e.g., for rendering or visualizing on a GUI, etc.) via one or more external/network port(s) to one or more networks or local terminals, such as computer network 120 and/or terminal 109 as described herein. In some aspects, server(s) 102 may include a client-server platform technology such as ASP.NET, Java J2EE, Ruby on Rails, Node.js, a web service or online API, responsive for receiving and responding to electronic requests. The server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Server(s) 102 may further include or implement an operator interface configured to present information to an administrator or operator and/or receive inputs from the administrator or operator. As shown in FIG. 1, an operator interface may provide a display screen (e.g., via terminal 109). Server(s) 102 may also provide I/O components (e.g., ports, capacitive or resistive touch sensitive input panels, keys, buttons, lights, LEDs), which may be directly accessible via, or attached to, server(s) 102 or may be indirectly accessible via or attached to terminal 109. According to some aspects, an administrator or operator may access the server 102 via terminal 109 to review information, make changes, and/or perform other functions.

As described herein, in some aspects, server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application (app), or code (e.g., first set of mobile app instructions 111c lap and second set of mobile app instructions 111c2ap, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 and/or processors of mobile devices 111c1 and/or 111c2 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

With reference to FIG. 1, first set of mobile app instructions 111c lap and second set of mobile app instructions 111c2ap may be comprised client portion(s) configured to execute on a mobile device (e.g., mobile device 111c1 and/or mobile device 111c1) and a server portion configured to execute on a processor (e.g., processor(s) 104) of a server (e.g., server(s) 102). In such aspects, the client portion(s) may communicate, with the server portion via computer network 120, where the client portion(s) and the server portion may communicate in order to implement the features and/or functionality described herein, for example, as describe herein with respect to FIG. 2. In such aspects, the server app portion or the client app portion(s) may each be configured to implement, or partially implement (e.g., in a distributed network implementation) one or more of: (1) detecting, with a first set of mobile app instructions, a triggering of a caregiving event; (2) passing, based on the triggering of the caregiving event, the control state from the expert mode to the novice mode; (3) rendering, based on the triggering of the caregiving event, the novice GUI in an interoperated sequence following rendering of the expert GUI; and (4) generating caregiving data of a novice user during the novice mode.

FIG. 2 illustrates an example multi-tiered GUI method 200 for interoperation between multiple mobile app modes during a real-time caregiving event, in accordance with various aspects disclosed herein. For example, in some aspects method 200 may comprise interoperating between multiple mobile application modes, such as an expert mode and novice mode (e.g., a parent mode and child mode), during a real-time caregiving event.

At block 202, multi-tiered GUI method 200 comprises rendering an expert GUI operating in or having an expert mode. For example, a first set of mobile app instructions (e.g., first set of mobile app instructions 111c lap) are configured to render an expert GUI (e.g., parental GUI 302 of FIG. 3A) operating in an expert (e.g., parental mode). The first set of mobile app instructions are configured for execution by one or more processors of one or more mobile devices (e.g., first mobile device 111c1). The expert or parental GUI may be a GUI operable by a nurse, parent, a babysitter, or a daycare worker, older sibling, or other expert or skilled user capable of operation of a feature rich GUI application.

At block 204, multi-tiered GUI method 200 comprises rendering a novice GUI operating in or having a novice mode. The expert mode (associated with or of the first set of mobile app instructions 111c lap) and the novice mode (associated with or of the second set of mobile app instructions 111c2ap) share a control state for passing operation between the expert mode and the novice mode. A second set of mobile app instructions (e.g., second set of mobile app instructions 111c2ap) are configured to render a novice GUI (e.g., child GUI 352 of FIG. 3B) operating in a novice mode (e.g., child mode). The second set of mobile app instructions are configured for execution by the one or more processors of one or more mobile devices (e.g., second mobile device 111c2).

In various embodiments, the novice GUI, as rendered during the novice mode, may comprise a different interface compared with the expert GUI, the novice GUI configured for manipulation by the novice user. For example, wherein the child GUI, as rendered during the child mode, comprises a different interface compared with the parental GUI, the child GUI configured for manipulation by the juvenile user. In some aspects, a different interface can comprise a simplified or difference interface. For example, a simplified interface can include a GUI with larger buttons, color graphics, and/or annotations as designed for a novice user.

In some aspects, the second set of mobile app instructions (e.g., second set of mobile app instructions 111c2ap) may be further configured to alter operation of the novice mode (e.g., child mode) based on a proficiency setting corresponding to a proficiency or ability level of the novice user (e.g., a child). The proficiency setting may cause at least one of: (a) a modification to the expert GUI (e.g., parental GUI); (b) a modification to the novice GUI (e.g., child GUI); or (c) a modification of the caregiving event (e.g., a hygiene event such as a toilet training event). For example, as the novice becomes more proficient, e.g., with caregiving, the proficiency setting may be configured to allow modification to the interoperability and/or look-and-feel of the GUI to accommodate or be commensurate with the novice's level of proficiency. In such aspects, the expert may correspondingly be less involved (e.g., more in a watch and monitor mode) and not an active participant. For example, in a toilet training hygiene example, initially a parent may need to accompany a novice (child) to the bathroom, and facilitate the end-to-end caregiving event, including pulling underwear up, wash or drying hands, etc. Eventually, however, the child will become more proficient, calling for the parent only if needed (e.g., needs wiping).

At block 206, multi-tiered GUI method 200 comprises detecting, with the first set of mobile app instructions, a triggering of a caregiving event. For example, a first set of mobile app instructions (e.g., first set of mobile app instructions 111c lap) is configured to indicate a triggering of a caregiving event (e.g., toilet training event). The triggering of the caregiving event cases each of: (a) the control state to be passed from the expert mode (e.g., parental mode) to the novice mode (e.g., child mode), and (b) the novice GUI (e.g., child GUI 352 of FIG. 3B) to be rendered in an interoperated sequence following the expert GUI (e.g., parental GUI 302).

In various aspects, the first set of mobile app instructions (e.g., first set of mobile app instructions 111c lap) may implement or execute a "while" loop or other coding loop to detect the triggering of the caregiving event. For example, a geographic location of a novice user (e.g., child or juvenile user, such as a child returning home from school), as determined from GPS data, may result in a "true" condition or state that would trigger the while loop to execute or implement the triggering of the caregiving event (e.g., toilet training event).

In further aspects, additionally, or alternatively, a novice GUI (e.g., child GUI 352) may be locked when the control state is passed from the expert mode (e.g., parent mode) to the novice mode (e.g., child mode), where novice (e.g., child GUI 352) when locked is unable to access the expert GUI (e.g., parental GUI 302). In such aspects, the novice GUI (e.g., child GUI 352) may be configured to be unlocked upon input of a unlock code (e.g., passcode, fingerprint, or face recognition of the parent). The input of the unlock code may cause the control state to be passed from the novice mode (e.g., child mode) to the expert mode (e.g., parent mode) and rendering of the expert GUI (e.g., parental GUI 352).

In still further aspects, triggering of the caregiving event (e.g., toilet training event) may comprise generation of a notification that the control state is to be passed from the expert mode (e.g., parent mode) to the novice mode (e.g., child mode). Such notification may be any one or more of e.g., visual, audible, or tactile notification indicating that a device (e.g., mobile device 111c1) has been, is, and/or should be passed from expert to novice, e.g., parent to child, or vice-versa, or in aspects with two devices (e.g., mobile device 111c1 and mobile device 111c2), that the novice should access the device for the novice, or vice-versa.

In various aspects, first set of mobile app instructions 111c lap may comprise an adaptive learning model. The adaptive learning model may be trained on caregiving data (e.g., toilet training data) of a plurality of novice users. The adaptive learning model is configured to trigger the caregiving event (e.g., toilet training event) at a time based on criteria input regarding the novice user (e.g., juvenile user). For example, the caregiving event (e.g., toilet training event) may be triggered based on a time of day (e.g., nighttime or bedtime of the child or novice user) or behavioral event (e.g., fluid intake of the novice user) as determined from the novice user's past caregiving events (e.g., as described herein for FIGS. 3A and/or 3B) and/or based on the trained adaptive learning model.

In additional aspects, the adaptive learning model may be retrained with the caregiving data (e.g., toilet training data of the juvenile user, as described herein for FIGS. 3A and/or 3B) to generate an updated adaptive learning model. The updated adaptive learning model may comprise an updated time to trigger the caregiving event (e.g., toilet training event for an updated adaptive learning model updating its timing based on the specific data recorded for the juvenile user).

In various aspects, the adaptive learning model of the first set of mobile app instructions 111c lap is an artificial intelligence (AI) based model trained with at least one AI algorithm. Training of the adaptive learning model of involves analysis of the caregiving data to configure weights of the adaptive learning model, and its underlying algorithm (e.g., machine learning or artificial intelligence algorithm) used to predict and/or classify future caregiving data and/or related events. For example, in various aspects herein, generation of the adaptive learning model involves training the adaptive learning model with the plurality of caregiving data and/or related events of similar users (e.g., toilet training data of juvenile users). In such aspects, server(s) and/or the cloud-based computing platform may collected and/or train adaptive learning model with the caregiving data and/or related event data of a plurality of similarly situated users (having similar ages, demographics, etc.).

In various aspects, a machine learning imaging model, as described herein (e.g. the adaptive learning model), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data (such as caregiving data in data collected across a plurality of similarly situated users) in order to facilitate making predictions, classifications, and/or identifications for subsequent data (such as using the model on new caregiving data of a novice user in order to determine or generate a classification or prediction for, or associated with, detecting a caregiving event, trigger, or otherwise updating a GUI, etc. as described herein).

Machine learning model(s), such as the adaptive learning model described herein for some aspects, may be created and trained based upon example data (e.g., "training data" comprising caregiving data and/or caregiving event related data) inputs or data (which may be termed "features" and "labels") in order to make valid and reliable predictions for new inputs, such as testing level or production level data or inputs. In supervised machine learning, a machine learning program operating on a server, mobile device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, mobile device, or otherwise processor(s), to predict, based on the discovered rules, relationships, or model, an expected output.

In unsupervised machine learning, the server, mobile device, or otherwise processor(s), may be required to find its own structure in unlabeled example inputs, where, for example multiple training iterations are executed by the server, mobile device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

With reference to FIG. 2, at block 208, multi-tiered GUI method 200 comprises passing, based on a triggering of the caregiving event, the control state from the expert mode to the novice mode. For example, a parental mode and a child mode of parental GUI 302 and child GUI 352, as illustrated herein for FIGS. 3A and 3B share a control state for passing operation between the parental mode and the child mode.

At block 210, multi-tiered GUI method 200 comprises rendering, based on the triggering of the caregiving event, the novice GUI (e.g., child GUI 352) in an interoperated sequence following rendering of the expert GUI (e.g., parental GUI 350). The interoperated sequence may be in real-time, near real-time, and/or may await confirmation input from either the expert and/or child GUI(s). The interoperated sequence may involve setting states, flags, and/or modes on each of the mobile device 111c1 and second mobile device 111c2 to cause states to control the mobile devices to operate for their given rolls, such as waiting, looping, collecting data, and/or displaying graphics and/or text while in use (or not in use) by a respective expert and/or novice user. Communications, including data communications, may occur (block 212) between first mobile device 111c1 and second mobile device 111c2 in order to facilitate the interoperated sequence and/or other data communications.

At blocks 214 and 216, multi-tiered GUI method 200 may comprise generating caregiving data of a novice user during the novice mode. Such data may be generated by the first mobile device 111c1 and/or second mobile device 111c2. For example, caregiving data of user (e.g., toilet training data of a juvenile user) may be generated during the novice mode (e.g., child mode). Such data may be used for various purposes, including, for example, training the adaptive learning model as described herein.

At blocks 218 and 220, multi-tiered GUI method 200 may comprise transmitting caregiving data (e.g., from one or both of first mobile device 111c1 and/or second mobile device 111c2) to server(s) 102. The caregiving data (e.g., training data) may be recorded on the one or more memories of the server (e.g., memorie(s) 105 and/or 106). In various aspects, servers(s) 102 may train adaptive learning model with the caregiving data as described herein.

At blocks 222 and 224 each of mobile device 111c1 and/or second mobile device 111c2 may rendered updated GUIs, including updated expert GUIs and updated novice GUIs, respectively, based on the generated caregiving data and/or related events. The updated GUIs may be rendered in response to user manipulation of the GUIs, repositioning of a respective mobile device (e.g., moving or geo-positioning of mobile device 111c1 and/or mobile device 111c2 as the device travels and/or as detected by GPS data), and/or the triggering of a caregiving event, such as a new or further caregiving event, such as the caregiving events as described herein (e.g., as described for parental GUI 302).

At block 226, multi-tiered GUI method 200 may comprise the second set of mobile app instructions (e.g., second set of mobile app instructions 111c2ap) being configured to indicate a triggering of a second caregiving event (e.g., second toilet training event). The triggering of the second toilet training event may cause each of: (a) the control state to be passed from the novice mode (e.g., child mode) to the expert mode (e.g., parent mode), and (b) the expert GUI (e.g., parental GUI 302) to be rendered in the interoperated sequence following the novice GUI (e.g., child GUI 352). In some aspects, triggering of the second toilet training event may comprise generating a second notification that the control state is to be passed from the child mode to the parent mode. The second notification may comprise a visual, audible, or tactile notification indicating that the device should be passed from novice to expert, e.g., child to parent, or, in aspects with two devices, that the expert (e.g., parent) should access the device for the expert.

At blocks 228 and 230, multi-tiered GUI method 200 comprises providing or transmitting at least a portion of the caregiving data, e.g., toilet training data, or related data, such as a summary or subset of such data, to a social media platform or other third party source 212. Such third party source may comprise FACEBOOK or other social media platform or source for reporting milestones to interested parties, e.g., who may encourage the juvenile user.

FIG. 3A illustrates an example expert GUI 302 as rendered or displayed on a screen of a first mobile device (e.g., mobile device 111c1) by first set of mobile app instructions 111c1ap and configured for sharing a control state for passing operation between an expert mode and a novice mode, for example as described for FIGS. 1 and 2, and otherwise in accordance with various aspects disclosed herein. As shown in the example of FIG. 3A, user interface 302 may be implemented or rendered via app instructions (e.g., first set of mobile app instructions 111c lap) executing on user mobile device 111c1. In the example of FIG. 3A, user mobile device 111c1 is a user computer device as described for FIG. 1, e.g., where mobile device 111c1 is illustrated as an APPLE iPhone that implements the APPLE iOS operating system and that has display screen 300. Mobile device 111c1 may execute one or more native applications (apps) on its operating system, including, for example, an app comprising the first set of mobile application (app) instructions 111c lap as described herein. Such native apps may be implemented or coded (e.g., as computing instructions) in a computing language (e.g., SWIFT) executable by the user mobile device operating system (e.g., APPLE iOS) by the processor of user mobile device 111c1.

Additionally, or alternatively, expert GUI 302 may be implemented or rendered via a web interface, such as via a web browser application, e.g., Safari and/or GOOGLE Chrome app(s), or other such web browser or the like.

Mobile device 111c1 may communicate via wireless communication 122, including, for example, passing control state, with other mobile devices, including, for example mobile device 111c2, as described herein. As shown for parental GUI 302, control state may be passed to mobile device 111c2 via selection of button 320. Control state may also be to mobile device 111c2 based on triggers or other events or actions as described herein.

As shown in the example of FIG. 3A, expert GUI 302 comprises a GUI configured to display, on display screen 300, various app features 304-320. Features 304-320 are executed by one or more processors of mobile device 111c1 and may be implemented by first set of mobile app instructions 111c lap. For example, in various embodiments, first set of mobile app instructions 111c lap are part of a mobile application (e.g., native mobile app) configured for execution on one or more processors of a mobile device (e.g., mobile device 111c1). In such aspects, the first set of mobile app instructions are initiated upon a menu selection within a menu of the mobile app. In the example of FIG. 3A, the menu selection is depicted as corresponding to real-time toilet training. Although, it is to be understood that other hygiene related events are contemplated herein.

In various embodiments, the mobile app (including first set of mobile app instructions 111c lap) are configured for download and install on the mobile device (e.g., mobile device 111c1). In such aspects, a unique id of a user (e.g., expert user such as a parent) may be generated upon download and install of the mobile app, and used for tracking and/or storage of caregiving data for the expert and/or novice. For example, in some aspects tracking and/or storage of hygiene or caregiving data may comprise tracking or assuming an amount of physical product (e.g., toilet paper) being used. Such data may be used to recommend products to the user, and may be user used by a supplier of the product(s) for tracking consumption habits.

In some embodiments, the first set of mobile app instructions 111c lap are configured to render the menu of the mobile app upon scanning a visible marking. For example, the first set of mobile app instructions 111c lap may comprise a product scanning GUI feature 304, that when selected causes a QR scanning window (or other scanning window, such as a barcode scanning window) to be displayed for scanning a physical product (e.g., a pack of toilet paper or diaper related product).

The visible marking may be affixed to a physical product and may comprise, by way of non-limiting example a barcode affixed to a toilet paper or diaper package. Additionally, or alternatively, the visible marking may be on a physical surface, such as a store shelf or other physical item associated with a hygiene product.

In some aspects, the visible marking (e.g., as affixed to the product) may be displayed via display screen 300. In some aspects, scanning of the product may cause the mobile app, as configured, to receive one or more electronic coupons associated with the product.

In an additional example aspect, the first set of mobile app instructions renders a product GUI feature 306. The product GUI feature may relate to a hygiene product (e.g., toilet paper) intended to address or be used with a caregiving event (e.g., toilet training).

In an additional example aspect, the first set of mobile app instructions is configured to render a sensor integration GUI feature 308. Sensor integration GUI feature 308 collects, visualizes, and/or manages caregiving data for products having sensors. In various aspects, mobile device 111c1 may receive, collect, and/or transmit (to server(s) 102) caregiving data for recording and/or training of AI models, such as adaptive learning model as described herein. For example, sensors embedded in diapers may provide leak detection by generating sensor data (e.g., caregiving data relating to body fluids), where the sensor data may be collected by mobile device 111c1 and may be used for AI training data, logging, tracking, or otherwise as described herein.

In some aspects, an expert GUI, such as parental GUI 302, may render one or more information screens during the parent mode and/or may be specific to generated caregiving data. For example, such information screens may comprise education and administrative functions or features, predictions, warnings, timers, logs, charts, etc. The information or data for such information screens may also include, provide, allow for, and/or facilitate certifications for fulfilling school requirements. As a further example, in the embodiment of FIG. 3A, information screens, for log GUI feature 312 and smart insight feature 314, display or render toilet training criteria specific to generated toilet training data.

Parental GUI 302 allows users (e.g., parents) to input information (e.g., age, background, location, etc.) of the parent and/or child in order to drive toilet hygiene and competency. In some aspects, parental GUI 302 may provide display information to assist a parent determine whether a child user is ready for toilet training, and, if so, at what level of proficiency the child is at. Additionally, or alternatively, parental GUI 302 may provide the parent options to define a GUI-based strategy for tracking, gathering, and/or proceeding with a caregiving event (e.g., toilet training event). For example, parental GUI 302 may be configured to provide screens for predetermining and/or otherwise tracking fluid consumption, timing of a dry diaper, and/or duration between hygiene incidents (e.g., toilet or diaper accident). In such aspects, when pre-determined or tracked criteria met, parental GUI 302 may provide screens informing or displaying that a child is ready for toilet training and/or other types of caregiving (e.g., hand washing).

As shown for parental GUI 302, in one aspect, the first set of mobile app instructions 111*c* lap renders a log GUI feature 312. Log GUI feature 312 is configured for tracking and displaying caregiving events (e.g., toilet training events), and circumstances around such events. For example, as illustrated, log GUI feature 312 displays various events and caregiving data (e.g., toilet training data) for caregiving events related to toilet training. As shown, three events are shown for the date of Jan. 1, 2021, where caregiving data is collected or recorded for caregiving events, comprising toilet training events occurring at each of: 6:03 AM (indicating a bowel movement (BM) of type 3 (indicating a type of stool) occurred and that the child wiped or cleaned himself or herself); 12:07 PM (indicating a urination event occurred and that the child flushed the toilet and washed his or her hands); and 5:23 PM (indicating a urination event occurred with an accident, e.g., urine found outside of the toilet or on the child or clothing was found). Data related to such events may be recorded, stored, and/or transmitted, for example, on or to a memory and/or database of mobile device 111*c*1 and/or server(s) 102.

In an additional aspect, the first set of mobile app instructions 111*c* lap may render on parental GUI 302 a timer feature (not shown) configured to provide alerts or reminders for upcoming caregiving events and notifications to encourage a user prepare for the event, e.g., going to a toilet to being the toilet event. Additionally, or alternatively, the timer feature may provide the ability to set alarms reminders for certain times and/or at recurring times.

In an additional example aspect, the first set of mobile app instructions 111*c* lap may render on parental GUI 302 a last call alert GUI feature (not shown) configured alert or warn parents to cut off certain foods, medicines, and/or liquids, for example, such as cutting off liquids to avoid bed wetting.

In an additional example aspect, the first set of mobile app instructions 111*c* lap may render on parental GUI 302 a progress report or chart GUI feature (not shown) configured to track log data and progress in a visually intuitive way. In some aspects, parental GUI 302 may also provide a screen or interface to take or upload pictures (e.g., digital images as captured by a digital camera of mobile device 111*c*1) at certain milestones in order to capture progress of caregiving (e.g., toilet training). In some aspects, such log data, progress, and/or pictures may be sharable via transmission to third-party sources(s) 212 as described herein.

In an additional aspect, the first set of mobile app instructions 111*c* lap renders on parental GUI 302 a smart insight GUI feature 314. In various aspects, smart insight GUI feature 314 uses or otherwise leverages caregiving data (e.g., log data as described for log GUI feature 312) for predicting caregiving events (e.g., dates, accidents, etc.). Smart insight GUI feature 314 may utilize an AI based model, such as adaptive learning model as trained on caregiving data, which may include log data as described for log GUI feature 312 and/or other data as described herein. The adaptive learning model may be implemented or executed by processors on mobile device 111*c*1 and/or server(s) 102.

As illustrated, smart insight GUI feature 314 displays various predicted or expected events (e.g., toilet training events). Such events may be output and/or determined by the adaptive learning model. As shown, three events are shown for the date of Jan. 2, 2021 (which is a future date in the example of FIG. 3A), where caregiving events (e.g., toilet training events) are predicted for toilet training events to occur at each of: 6:00 AM (predicting a bowel movement (BM) of type 3 (indicating a type of stool); 12:00 PM (predicting a urination event); and 5:30 PM (predicting a urination event). Such events may be predicted, by adaptive learning model, based on log data, as shown for log GUI feature 312, an/or other caregiving data which adaptive learning model is trained. It is to be understood that additional and/or different caregiving data may be used to train adaptive learning model in order to make it more robust and/or reduce its error rate.

In additional aspects, adaptive learning model may be updated so as to evolve with a user (e.g., expert and/or novice, parent and/or child) and/or user interaction with respective GUIs (e.g., parental GUI 302 and/or child GUI 352). For example, adaptive learning model, in various aspects, may be configured (such as trained or retrained with related caregiving data, including over time) to determine recommend or optimal timer interval for a child's age or gender. Such determinations or recommendations may be based on caregiving data events or intervals from caregiving data collected or recorded locally with a specific child and/or globally with caregiving data of other users (e.g., other child users).

In additional aspects, adaptive learning model, in various aspects, may be configured (such as trained or retrained with related caregiving data, including over time) to remind a parent at a time the child should use the toilet (e.g., bedtime). Such activity may establish a routine. Such reminders may be based on caregiving data events or intervals from caregiving data collected or recorded locally with a specific child and/or globally with caregiving data of other users (e.g., other child users).

In additional aspects, adaptive learning model, in various aspects, may be configured (such as trained or retrained with related caregiving data, including over time) to identify when a child has completed caregiving milestones (e.g., learning to flush, sitting on toilet by him/herself, etc.) to recommend optimal progression or next steps.

In additional aspects, adaptive learning model, in various aspects, may be configured (such as trained or retrained with related caregiving data, including over time) to educate parents and users, and in some aspects based on recognizing unique input of parent or parent background information, for customizing app experience to the specific user (e.g., recognizing a child's current stage in toilet training and providing education, routines specific a specific age, stage, etc.). In such aspects, the parental GUI 302 and/or child GUI 352 may transition, adjust, or be updated to change or update GUI displays or rendering (e.g., as described herein for FIG. 2) and material as child progresses. Such progress may be may be sharable (via images, photos, graphs/charts, etc.) via messaging or social media, multi-caregiver access, etc., for example, by transmitting such data or images to social media platforms or other third party sources (e.g., third-party sources 212).

Any and all of the adaptive learning model learning output or features may be rendered or displayed via smart insight GUI feature 314 or in other features or areas of parental GUI 302.

In various aspects, an expert GUI comprises a toilet location interface (e.g., toilet finder feature 316) configured to geographically locate one or more physical toilets. For example, as shown for parental GUI 302, first set of mobile app instructions renders a toilet finder GUI feature 316. Toilet finder GUI feature 316 may comprise a map GUI that shows locations of toilets in the area. Additionally, or alternatively, the toilet finder GUI feature 316, or parental GUI, may comprise a reminder interface configured to display a reminder via the parental GUI when a mobile device (e.g., mobile device 111c1) rendering the parental GUI geo-locates away from or toward a toilet location. For example, as shown for finder GUI feature 316, a reminder indicates that the user is "moving away from nearest physical toilet" with the physical toilet marked on the map GUI. Other reminders or comments may also be provided, e.g., "now moving away from toilet location where you have been located for a while," where such message is rendered when the user is at home or at a restaurant for a given time so as to provide a reminder to take a child to the restroom before moving to a new location. Other messages and reminders may be triggered based on movement or location of the child, e.g., alerts may be triggered by a child leaving and returning from school to home, and may include hygiene reminders. In still further aspects, a mobile device (e.g., mobile device 111c1) may beep or provide some other audio indication when location changes reminding a parent that a caregiving event (e.g., toilet training event) should occur based on geo-positioning or geo-locationing.

In an additional example aspect, the first set of mobile app instructions 111c lap may render on parental GUI 302 an education GUI feature (not shown) configured to provide content guidance to parents. In some aspects, the education GUI feature may include an educational or boot-camp experience mode providing training and experience that aids parents desiring training over a weekend or other period of time.

In an additional example aspect, the first set of mobile app instructions 111c lap may render on parental GUI 302a personalization GUI feature (not shown) configured to input information about child to get a customized experience.

In an additional example aspect, the first set of mobile app instructions 111c lap may render on parental GUI 302 a team GUI feature (not shown) configured to allow multiple users to access experience (e.g., limited access for certain users, such as a babysitter or nurse)). The parental GUI may be rendered on a third mobile device as described for FIG. 1.

In an additional example aspect, the first set of mobile app instructions 111c lap may render on parental GUI 302 a readiness checklist GUI feature (not shown) configured to indicate whether a child is ready to start or move on to next hygiene milestone.

In an additional example aspect, the first set of mobile app instructions 111c lap may render on parental GUI 302 a skill tracking GUI feature (not shown) configured to track skills that qualify a child as having achieved a milestone, e.g., "fully potty trained."

FIG. 3B illustrates an example child GUI 352 as rendered or displayed on a screen 350 of a second mobile device (e.g., mobile device 111c2) by a second set of mobile app instructions (e.g., second set of mobile app instructions 111c2ap) and configured for sharing the control state for passing operation between the expert mode and the novice mode as described for FIGS. 1, 2, and FIG. 3A, and in accordance with various aspects disclosed herein.

As shown in the example of FIG. 3B, user interface 352 may be implemented or rendered via app instructions (e.g., second set of mobile app instructions 111c2ap) executing on user mobile device 111c2. In the example of FIG. 3B, user mobile device 111c2 is a user computer device as described for FIG. 1, e.g., where mobile device 111c2 is illustrated as an APPLE iPhone that implements the APPLE iOS operating system and that has display screen 350. Mobile device 111c2 may execute one or more native applications (apps) on its operating system, including, for example, an app comprising the second set of mobile application (app) instructions 111c2ap as described herein. Such native apps may be implemented or coded (e.g., as computing instructions) in a computing language (e.g., SWIFT) executable by the user mobile device operating system (e.g., APPLE iOS) by the processor of user mobile device 111c2.

Additionally, or alternatively, child GUI 352 may be implemented or rendered via a web interface, such as via a web browser application, e.g., Safari and/or GOOGLE Chrome app(s), or other such web browser or the like.

Mobile device 111c2 may communicate via wireless communication 122, including, for example, passing control state, with other mobile devices, including, for example mobile device 111c1, as describe herein. As shown for child GUI 352, control state may be passed to mobile device 111c1 via selection of button 370. Control state may also be to mobile device 111c1 based on triggers or other events or actions as described herein.

As shown in the example of FIG. 3B, child GUI 352 comprises a GUI configured to display, on display screen 350, various app features 354-370. Features 354-370 are executed by one or more processors of mobile device 111c2 and may be implemented by second set of mobile app instructions 111c2ap.

Interaction (e.g., by a child or novice) with child GUI 352, including games, rewards, etc. as described and shown, may cause generation of caregiving event data (e.g., toilet training data). For example, child GUI 352 may render one or more interactive screens during the child mode, wherein the manipulation by the juvenile user of the interactive screens causes generation of at least a portion of caregiving data (e.g., toilet training data). Such data may be used for training the adaptive learning model and/or updating a log as described herein.

In one example aspect, the second set of mobile app instructions 111c2ap renders on child GUI 352 a games or experiences GUI feature 354 configured to render content or games designed to educate or distract a child during a caregiving event (e.g., toilet training event). In some aspects, the second set of mobile app instructions 111c2ap renders a gamification GUI feature (not shown) configured to adapt and unlock certain features or rewards throughout the caregiving experience. For example, in some aspects, a mobile app may be configured to track as novice user as the novice user completes milestones regarding mastering hygiene (e.g., by demonstrating or logging skills demonstrated). As a novice user satisfies requirements of each milestone (e.g., sits on toilet by themselves, wipes without help, goes in public, etc.) the novice user may complete the skills needed in order to be classified as a next stage (e.g., "fully trained"), which may, in some instances, complete an app experience gamification mode.

In an additional example aspect, the second set of mobile app instructions 111c2ap may render on child GUI 352 a child motivation GUI feature (not shown) configured to incentivize and encourage child via tangible ("treats") and intangible ("trip to the zoo") rewards.

In an additional example aspect, the second set of mobile app instructions 111c2ap may render on child GUI 352 a custom rewards GUI feature (not shown) configured to provide audio/video of important people in child's life (e.g., father, mother, grandmother, etc.) the encouraging child to continue with the toilet training event. Additionally, or alternatively the second set of mobile app instructions 111c2ap may output or display a time narrative for kids struggling with wetting the bed.

In some aspects, child GUI 352 comprises an augmented reality (AR) interface configured to superimpose one or more virtual images (e.g., virtual image 360s and 360t) on or with one or more images of a real-world scene, which may comprise a physical toilet (e.g., scene 360). In some aspects, the one or more virtual images comprise graphical indication(s) to interact with the physical toilet or real-world scene. For example, as shown for scene 360 (which depicts a bathroom), the virtual images include graphical indicators to flush the toilet (e.g., virtual image 360t) using the handle and to wash hands in the sink (e.g., virtual image 360s). Additional or different virtual images may also be displayed, including, for example, lifting the toilet seat, taking toilet paper from a roll, etc. It is to be understood that other scenes (of other rooms or areas) involving additional and/or different caregiving events and related virtual images may be used and are contemplate herein.

In some aspects, the AR interface is initiated automatically when the digital camera of mobile device 111c2 detects a room having a hygiene related feature (e.g., toilet or sink). In other embodiments, the AR interface may be initiated by the child user upon selection, e.g., selection of a GUI button (e.g., button 356), which may be for a specific caregiving event (e.g., hand washing). In some aspects, a song/guide may be played or displayed to indicate how long to wash hangs.

In still further aspects, virtual images as displayed or rendered by (AR) interface may comprise a graphical character 362 (e.g., an animated bear) instructing the child user during at least a portion of the caregiving event. In some aspects, the graphical character 362 may be shown in a separate window or area of child GUI 352. Additionally, or alternatively, the graphical character 362 may be shown with, such as superimposed on, the scene 360 so as to appear directly interacting with the scene 360 and various portions thereof (e.g., toilet handle and/or sink) to provide the child with visual instruction as to the caregiving event (e.g., toilet training event).

Aspects of the Disclosure

The following aspects are provided as examples in accordance with the disclosure herein and are not intended to limit the scope of the disclosure.

1. A multi-tiered graphical user interface (GUI) system configured to interoperate between multiple mobile application modes during a real-time toilet training event, the multi-tiered GUI system comprising: a first set of mobile application (app) instructions configured to render a parental GUI operating in a parental mode, the first set of mobile app instructions configured for execution by one or more processors of one or more mobile devices; a second set of mobile app instructions configured to render a child GUI operating in a child mode, the second set of mobile app instructions configured for execution by the one or more processors of the one or more mobile devices; and a server comprising one or more processors and one or more memories, wherein each of the one or more mobile devices are communicatively coupled to the server, wherein the parental mode and the child mode share a control state for passing operation between the parental mode and the child mode, wherein the first set of mobile app instructions is configured to indicate a triggering of a toilet training event, the triggering of the toilet training event causing each of: (a) the control state to be passed from the parental mode to the child mode, and (b) the child GUI to be rendered in an interoperated sequence following the parental GUI, wherein toilet training data of a juvenile user is generated during the child mode, wherein the training data is recorded on the one or more memories of the server, and wherein the child GUI, as rendered during the child mode, comprises a different interface compared with the parental GUI, the child GUI configured for manipulation by the juvenile user.

2. The multi-tiered GUI system of aspect 1, wherein the second set of mobile app instructions are configured to indicate a triggering of a second toilet training event, the triggering of the second toilet training event causing each of: (a) the control state to be passed from the child mode to the parent mode, and (b) the parental GUI to be rendered in the interoperated sequence following the child GUI.

3. The multi-tiered GUI system of any one of aspects 1-2, wherein the child GUI is locked when the control state is passed from the parent mode to the child mode, the child GUI when locked being unable to access the parental GUI.

4. The multi-tiered GUI system of aspect 3, wherein the child GUI is configured to be unlocked upon input of a unlock code, the input of the unlock code causing the control state to be passed from the child mode to the parent mode and rendering of the parental GUI.

5. The multi-tiered GUI system of any one of aspects 1-4 further comprising a third set of mobile app instructions configured to render a second parental GUI operating in the parental mode, the third set of mobile app instructions configured for execution by one or more processors of one or more mobile devices, wherein the triggering of the toilet training event causes the child GUI to be rendered in an interoperated sequence following the second parental GUI.

6. The multi-tiered GUI system of any one of aspects 1-5, wherein the first set of mobile app instructions are part of a first mobile app configured for execution on one or more processors of a first mobile device, wherein the second set of mobile app instructions are part of a second mobile app configured for execution on one or more processors of a second mobile device, wherein the first mobile device is communicatively coupled to the second mobile device, and wherein passing the control state from the parental mode to the child mode causes the child GUI to be rendered on a display screen of the second mobile device.

7. The multi-tiered GUI system of any one of aspects 1-6, wherein the first set of mobile app instructions and the second set of mobile app instructions are part of a single mobile application, and wherein the one or more processors comprises one or more processors of a single mobile device.

8. The multi-tiered GUI system of any one of aspects 1-7, wherein triggering of the toilet training event comprises generating a notification that the control state is to be passed from the parent mode to the child mode.

9. The multi-tiered GUI system of aspect 2, wherein triggering of the second toilet training event comprises generating a second notification that the control state is to be passed from the child mode to the parent mode.

10. The multi-tiered GUI system of any one of aspects 1-9, wherein the child GUI renders one or more interactive screens during the child mode, wherein the manipulation by the juvenile user of the interactive screens causes generation of at least a portion of the toilet training data.

11. The multi-tiered GUI system of any one of aspects 1-10, wherein the parental GUI renders one or more information screens during the parent mode, wherein the information screens display toilet training criteria specific to the generated toilet training data.

12. The multi-tiered GUI system of any one of aspects 1-11, wherein the parental GUI comprises a toilet location interface configured to geographically locate one or more physical toilets.

13. The multi-tiered GUI system of any one of aspects 1-12, wherein the parental GUI comprises a reminder interface configured to display a reminder via the parental GUI when a mobile device rendering the parental GUI geo-locates away from a toilet location.

14. The multi-tiered GUI system of any one of aspects 1-13, wherein the child GUI comprises an augmented reality (AR) interface configured to superimpose one or more virtual images on or with one or more images of a real-world scene.

15. The multi-tiered GUI system of aspect 14, wherein the one or more virtual images comprise a graphical indication to interact with a physical toilet or real-world scene.

16. The multi-tiered GUI system of aspect 14, wherein the one or more virtual images comprise a graphical character.

17. The multi-tiered GUI system of any one of aspects 1-16, wherein at least a portion of the toilet training data or a summary of the toilet training data is provided to a social media platform.

18. The multi-tiered GUI system of any one of aspects 1-17 further comprising an adaptive learning model, the adaptive learning model trained on toilet training data of a plurality of juvenile users, the adaptive learning model configured to trigger the toilet training event at a time based on criteria input regarding the juvenile user.

19. The multi-tiered GUI system of aspect 18, wherein the adaptive learning model is retrained with the toilet training data of the juvenile user to generate an updated adaptive learning model, the updated adaptive learning model comprising a an updated time to trigger the toilet training event.

20. The multi-tiered GUI system of any one of aspects 1-19, wherein the toilet training event is triggered based on a geographic location of the juvenile user.

21. The multi-tiered GUI system of any one of aspects 1-20, wherein the toilet training event is triggered based on a time of day.

22. The multi-tiered GUI system of any one of aspects 1-21, wherein the second set of mobile app instructions are further configured to alter operation of the child mode based on a proficiency setting, wherein the proficiency setting causes at least one of: (a) a modification to the parental GUI; (b) a modification to the child GUI; or (c) a modification of the toilet training event.

23. The multi-tiered GUI system of any one of aspects 1-22, wherein the first set of mobile app instructions are part of a mobile application configured for execution on one or more processors of a mobile device, and wherein the first set of mobile app instructions are initiated upon a menu selection within a menu of the mobile app, the menu selection corresponding to real-time toilet training.

24. The multi-tiered GUI system of aspect 24, wherein the menu of the mobile app is rendered upon scanning a visible marking.

25. The multi-tiered GUI system of aspect 25, wherein the visible marking is affixed to a physical product.

26. The multi-tiered GUI system of aspect 25, wherein the visible marking is on a physical surface.

27. The multi-tiered GUI system of aspect 25, wherein the visible marking is displayed via a display screen.

28. The multi-tiered GUI system of aspect 24, wherein the mobile app is configured for download and install on the mobile device, and wherein a unique id of a user is generated upon download and install of the mobile app.

29. The multi-tiered GUI system of aspect 24, wherein the mobile app is configured to receive one or more electronic coupons.

30. A multi-tiered graphical user interface (GUI) system configured to interoperate between multiple mobile application modes during a real-time caregiving event, the multi-tiered GUI system comprising: first set of mobile application (app) instructions configured to render an expert GUI operating in an expert mode, the first set of mobile app instructions configured for execution by one or more processors of one or more mobile devices; a second set of mobile app instructions configured to render a novice GUI operating in a novice mode, the second set of mobile app instructions configured for execution by the one or more processors of the one or more mobile devices; and a server comprising one or more processors and one or more memories, wherein each of the one or more mobile devices are communicatively coupled to the server, wherein the expert mode and the novice mode share a control state for passing operation between the expert mode and the novice mode, wherein the first set of mobile app instructions is configured to indicate a triggering of a caregiving event, the triggering of the caregiving event causing each of: (a) the control state to be passed from the expert mode to the novice mode, and (b) the novice GUI to be rendered in an interoperated sequence following the expert GUI, wherein caregiving data of a novice user is generated during the novice mode, wherein the caregiving data is recorded on the one or more memories of the server, and wherein the novice GUI, as rendered during the novice mode, comprises a different interface compared with the expert GUI, the novice GUI configured for manipulation by the novice user.

31. A multi-tiered graphical user interface (GUI) method for interoperation between multiple mobile application modes during a real-time caregiving event, the multi-tiered GUI method comprising: rendering an expert GUI operating in an expert mode; rendering a novice GUI operating in a novice mode, wherein the expert mode and the novice mode share a control state for passing operation between the expert mode and the novice mode; detecting, with a first set of mobile app instructions, a triggering of a caregiving event; passing, based on a triggering of the caregiving event, the control state from the expert mode to the novice mode; rendering, based on the triggering of the caregiving event, the novice GUI in an interoperated sequence following rendering of the expert GUI; and generating caregiving data of a novice user during the novice mode, wherein the novice GUI, as rendered during the novice mode, comprises a different interface compared with the expert GUI, the novice GUI configured for manipulation by the novice user.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-tiered graphical user interface (GUI) system configured to interoperate between multiple mobile application modes during a real-time toilet training event, the multi-tiered GUI system comprising:
   a first set of mobile application (app) instructions configured to render a parental GUI operating in a parental mode, the first set of mobile app instructions configured for execution by one or more processors of one or more mobile devices;
   a second set of mobile app instructions configured to render a child GUI operating in a child mode, the second set of mobile app instructions configured for execution by the one or more processors of the one or more mobile devices; and a server comprising one or more processors and one or more memories, wherein each of the one or more mobile devices are communicatively coupled to the server, wherein the parental mode and the child mode share a control state for passing operation between the parental mode and the child mode, wherein the first set of mobile app instructions is configured to indicate a triggering of a toilet training event, the triggering of the toilet training event causing each of: (a) the control state to be passed from the parental mode to the child mode, and (b) the child GUI to be rendered in an interoperated sequence following the parental GUI, wherein toilet training data of a juvenile user is generated during the child mode, wherein the training data is recorded on the one or more memories of the server, and wherein the child GUI, as rendered during the child mode, comprises a different interface compared with the parental GUI, the child GUI configured for manipulation by the juvenile user.

2. The multi-tiered GUI system of claim 1, wherein the second set of mobile app instructions are configured to indicate a triggering of a second toilet training event, the triggering of the second toilet training event causing each of: (a) the control state to be passed from the child mode to the parent mode, and (b) the parental GUI to be rendered in the interoperated sequence following the child GUI.

3. The multi-tiered GUI system of claim 1, wherein the child GUI is locked when the control state is passed from the parent mode to the child mode, the child GUI when locked being unable to access the parental GUI.

4. The multi-tiered GUI system of claim 3, wherein the child GUI is configured to be unlocked upon input of a unlock code, the input of the unlock code causing the control state to be passed from the child mode to the parent mode and rendering of the parental GUI.

5. The multi-tiered GUI system of claim 1 further comprising a third set of mobile app instructions configured to render a second parental GUI operating in the parental mode, the third set of mobile app instructions configured for execution by one or more processors of one or more mobile devices, wherein the triggering of the toilet training event causes the child GUI to be rendered in an interoperated sequence following the second parental GUI.

6. The multi-tiered GUI system of claim 1, wherein the first set of mobile app instructions are part of a first mobile app configured for execution on one or more processors of a first mobile device, wherein the second set of mobile app instructions are part of a second mobile app configured for execution on one or more processors of a second mobile device, and wherein the first mobile device is communicatively coupled to the second mobile device, and wherein passing the control state from the parental mode to the child mode causes the child GUI to be rendered on a display screen of the second mobile device.

7. The multi-tiered GUI system of claim 1, wherein the first set of mobile app instructions and the second set of mobile app instructions are part of a single mobile application, and wherein the one or more processors comprises one or more processors of a single mobile device.

8. The multi-tiered GUI system of claim 1, wherein triggering of the toilet training event comprises generating a notification that the control state is to be passed from the parent mode to the child mode.

9. The multi-tiered GUI system of claim 2, wherein triggering of the second toilet training event comprises generating a second notification that the control state is to be passed from the child mode to the parent mode.

10. The multi-tiered GUI system of claim 1, wherein the child GUI renders one or more interactive screens during the child mode, wherein the manipulation by the juvenile user of the interactive screens causes generation of at least a portion of the toilet training data.

11. The multi-tiered GUI system of claim 1, wherein the parental GUI renders one or more information screens during the parent mode, wherein the information screens display toilet training criteria specific to the generated toilet training data.

12. The multi-tiered GUI system of claim 1, wherein the parental GUI comprises a toilet location interface configured to geographically locate one or more physical toilets.

13. The multi-tiered GUI system of claim 1, wherein the parental GUI comprises a reminder interface configured to display a reminder via the parental GUI when a mobile device rendering the parental GUI geo-locates away from a toilet location.

14. The multi-tiered GUI system of claim 1, wherein the child GUI comprises an augmented reality (AR) interface configured to superimpose one or more virtual images on or with one or more images of a real-world scene.

15. The multi-tiered GUI system of claim 14, wherein the one or more virtual images comprise a graphical indication to interact with a physical toilet or real-world scene.

16. The multi-tiered GUI system of claim 14, wherein the one or more virtual images comprise a graphical character.

17. The multi-tiered GUI system of claim 1, wherein at least a portion of the toilet training data or a summary of the toilet training data is provided to a social media platform.

18. The multi-tiered GUI system of claim 1 further comprising an adaptive learning model, the adaptive learning model trained on toilet training data of a plurality of juvenile users, the adaptive learning model configured to trigger the toilet training event at a time based on criteria input regarding the juvenile user.

19. The multi-tiered GUI system of claim 18, wherein the adaptive learning model is retrained with the toilet training data of the juvenile user to generate an updated adaptive learning model, the updated adaptive learning model comprising an updated time to trigger the toilet training event.

20. The multi-tiered GUI system of claim 1, wherein the toilet training event is triggered based on a geographic location of the juvenile user.

21. The multi-tiered GUI system of claim 1, wherein the toilet training event is triggered based on a time of day.

22. The multi-tiered GUI system of claim 1, wherein the second set of mobile app instructions are further configured to alter operation of the child mode based on a proficiency setting, wherein the proficiency setting causes at least one of: (a) a modification to the parental GUI; (b) a modification to the child GUI; or (c) a modification of the toilet training event.

23. The multi-tiered GUI system of claim 1, wherein the first set of mobile app instructions are part of a mobile application configured for execution on one or more processors of a mobile device, and wherein the first set of mobile app instructions are initiated upon a menu selection within a menu of the mobile app, the menu selection corresponding to real-time toilet training.

24. The multi-tiered GUI system of claim 23, wherein the menu of the mobile app is rendered upon scanning a visible marking.

25. The multi-tiered GUI system of claim 24, wherein the visible marking is affixed to a physical product.

26. The multi-tiered GUI system of claim 25, wherein the visible marking is on a physical surface.

27. The multi-tiered GUI system of claim 25, wherein the visible marking is displayed via a display screen.

28. The multi-tiered GUI system of claim 24, wherein the mobile app is configured for download and install on the mobile device, and wherein a unique id of a user is generated upon download and install of the mobile app.

29. The multi-tiered GUI system of claim 24, wherein the mobile app is configured to receive one or more electronic coupons.

30. A multi-tiered graphical user interface (GUI) system configured to interoperate between multiple mobile application modes during a real-time caregiving event, the multi-tiered GUI system comprising:
- a first set of mobile application (app) instructions configured to render an expert GUI operating in an expert mode, the first set of mobile app instructions configured for execution by one or more processors of one or more mobile devices;
- a second set of mobile app instructions configured to render a novice GUI operating in a novice mode, the second set of mobile app instructions configured for execution by the one or more processors of the one or more mobile devices; and
- a server comprising one or more processors and one or more memories, wherein each of the one or more mobile devices are communicatively coupled to the server,
- wherein the expert mode and the novice mode share a control state for passing operation between the expert mode and the novice mode,
- wherein the first set of mobile app instructions is configured to indicate a triggering of a caregiving event, the triggering of the caregiving event causing each of: (a) the control state to be passed from the expert mode to the novice mode, and (b) the novice GUI to be rendered in an interoperated sequence following the expert GUI,
- wherein caregiving data of a novice user is generated during the novice mode,
- wherein the caregiving data is recorded on the one or more memories of the server, and
- wherein the novice GUI, as rendered during the novice mode, comprises a different interface compared with the expert GUI, the novice GUI configured for manipulation by the novice user.

31. A multi-tiered graphical user interface (GUI) method for interoperation between multiple mobile application modes during a real-time caregiving event, the multi-tiered GUI method comprising:
- rendering an expert GUI operating in an expert mode;
- rendering a novice GUI operating in a novice mode, wherein the expert mode and the novice mode share a control state for passing operation between the expert mode and the novice mode;
- detecting, with a first set of mobile app instructions, a triggering of a caregiving event;
- passing, based on the triggering of the caregiving event, the control state from the expert mode to the novice mode;
- rendering, based on the triggering of the caregiving event, the novice GUI in an interoperated sequence following rendering of the expert GUI; and
- generating caregiving data of a novice user during the novice mode,
- wherein the novice GUI, as rendered during the novice mode, comprises a different interface compared with the expert GUI, the novice GUI configured for manipulation by the novice user.

* * * * *